United States Patent
Festa

(10) Patent No.: US 11,557,060 B2
(45) Date of Patent: Jan. 17, 2023

(54) SYSTEMS AND METHODS FOR SCANNING THREE-DIMENSIONAL OBJECTS

(71) Applicant: Wayfair LLC, Boston, MA (US)

(72) Inventor: Michael Silvio Festa, Wakefield, MA (US)

(73) Assignee: Wayfair LLC, Boston, MA (US)

( * ) Notice: Subject to any disclaimer, the term of this patent is extended or adjusted under 35 U.S.C. 154(b) by 217 days.

(21) Appl. No.: 16/597,794

(22) Filed: Oct. 9, 2019

(65) Prior Publication Data
US 2020/0143565 A1    May 7, 2020

Related U.S. Application Data

(60) Provisional application No. 62/756,047, filed on Nov. 5, 2018.

(51) Int. Cl.
  *G06T 7/73*    (2017.01)
  *G06T 17/00*   (2006.01)
  *G06T 19/00*   (2011.01)

(52) U.S. Cl.
  CPC ............ *G06T 7/75* (2017.01); *G06T 17/00* (2013.01); *G06T 19/006* (2013.01); *G06T 2207/10008* (2013.01); *G06T 2207/10028* (2013.01)

(58) Field of Classification Search
  CPC .. G06T 7/50; G06T 7/521; G06T 7/70; G06T 7/75; G06T 17/00; G06T 2207/10008; G06T 2207/10028
  See application file for complete search history.

(56) References Cited

U.S. PATENT DOCUMENTS

| | | | |
|---|---|---|---|
| 8,668,498 B2 | 3/2014 | Calman et al. |
| 9,374,517 B2 | 6/2016 | Glasgow |
| 9,728,010 B2 | 8/2017 | Thomas et al. |
| 10,878,636 B2 | 12/2020 | Spivack |
| 11,055,919 B2 | 7/2021 | Nattinger et al. |

(Continued)

FOREIGN PATENT DOCUMENTS

GB    2494697 A    3/2013

OTHER PUBLICATIONS

[No Author Listed], Apple unveils new iPad Pro with breakthrough LiDAR Scanner and brings trackpad support to iPadOS. Apple, Inc. Mar. 18, 2020. https://www.apple.com/newsroom/2020/03/apple-unveils-new-ipad-pro-with-lidar-scanner-and-trackpad-support-in-ipados/ [last accessed Jan. 12, 2021]. 11 pages.

(Continued)

*Primary Examiner* — Diane M Wills
(74) *Attorney, Agent, or Firm* — Wolf, Greenfield & Sacks, P.C.

(57) ABSTRACT

According to at least one aspect, a system for scanning an object is provided. The system comprises at least one hardware processor; and at least one non-transitory computer-readable storage medium storing processor executable instructions that, when executed by the at least one hardware processor, cause the at least one hardware processor to perform: generating a first 3-dimensional (3D) model of the object; identifying a set of imaging positions from which to capture at least one image based on the first 3D model of the object; obtaining a set of images of the object captured at, or approximately at, the set of imaging positions; and generating a second 3D model of the object based on the set of images.

15 Claims, 4 Drawing Sheets

(56) References Cited

U.S. PATENT DOCUMENTS

| | | | |
|---|---|---|---|
| 11,113,755 | B2 | 9/2021 | Sacco |
| 2002/0008700 | A1* | 1/2002 | Fuki ........................ G06T 17/10 |
| | | | 345/422 |
| 2013/0335409 | A1* | 12/2013 | Yamamoto .............. G06T 17/00 |
| | | | 345/419 |
| 2016/0253809 | A1* | 9/2016 | Cole .................... H04N 13/271 |
| | | | 345/672 |
| 2017/0039613 | A1 | 2/2017 | Kaehler et al. |
| 2018/0198976 | A1 | 7/2018 | Upendran et al. |
| 2019/0197768 | A1* | 6/2019 | Taylor ................. G06F 3/04815 |
| 2019/0279420 | A1* | 9/2019 | Moreno ............... G01C 15/002 |
| 2020/0082168 | A1* | 3/2020 | Fathi ..................... B64C 39/024 |
| 2021/0248669 | A1 | 8/2021 | Wade et al. |
| 2021/0377365 | A1 | 12/2021 | Enthed |

OTHER PUBLICATIONS

[No Author Listed], Canvas by Occipital. Occipital, Inc. 2020. https://canvas.io/ [last accessed Jan. 11, 2021]. 12 pages.

[No Author Listed], Capture: 3D Scan Anything. Apple, Inc. 2021. https://apps.apple.com/us/app/capture-3d-scan-anything/id1444183458 [last accessed Jan. 15, 2021]. 3 pages.

[No Author Listed], Case Study: Taking Photographs With a Phone. Etsy, Inc. May 29, 2017. https://www.etsy.com/seller-handbook/article/case-study-taking-photographs-with-a/144433000334 [last accessed Jan. 17, 2021]. 8 pages.

[No Author Listed], ColorChecker Camera Calibration Software. X-Rite, Incorporated. 2021. https://xritephoto.com/CameraCalibration [last accessed May 28, 2021]. 1 page.

[No Author Listed], From Reviews to Revenue vol. 1. Power Reviews. 2016. https://www.powerreviews.com/wp-content/uploads/2016/04/Northwestern-Vol1.pdf [last accessed Jan. 29, 2021]. 1-22.

[No Author Listed], Get camera field of view in iOS 11 ARKit. Stack Overflow. Nov. 28, 2017. https://stackoverflow.com/questions/47536580/get-camera-field-of-view-in-ios-11-arkit [last accessed May 28, 2021]. 4 pages.

[No Author Listed], get pitch, yaw, roll from a CMRotationMatrix. Stack Overflow. Feb. 28, 2012. https://stackoverflow.com/questions/9478630/get-pitch-yaw-roll-from-a-cmrotationmatrix [last accessed May 28, 2021]. 3 pages.

[No Author Listed], How to capture 3D scans on your iPhone or iPad using the Matterport Capture app—Part 2. Matterport, YouTube. May 2, 2020. https://www.youtube.com/watch?app=desktop&v=wLIzWD1gru8 [last accessed May 28, 2021]. 16 pages.

[No Author Listed], Model Your World in 3D. Trnio. 2021. https://www.trnio.com/ [last accessed Jan. 10, 2021]. 4 pages.

[No Author Listed], Scanning and Detecting 3D Objects. Apple, Inc. 2021. https://developer.apple.com/documentation/arkit/content_anchors/scanning_and_detecting_3d_objects [last accessed May 28, 2021]. 6 pages.

[No Author Listed], scipy.optimize.brentq. The SciPy community. Apr. 26, 2021. https://docs.scipy.org/doc/scipy/reference/generated/scipy.optimize.brentq.html#scipy.optimize.brentq [last accessed May 28, 2021]. 4 pages.

[No Author Listed], The Ultimate Guide to Product Photography. Etsy, Inc. Jan. 1, 2020. https://www.etsy.com/seller-handbook/article/the-ultimate-guide-to-product/143986679284 [last accessed Jan. 15, 2021]. 3 pages.

[No Author Listed], Tips for Taking Photos that Sell. eBay, Inc. 2020. https://pages.ebay.com/seller-center/listing-and-marketing/photo-tips.html#tips [last accessed Jan. 15, 2021]. 6 pages.

[No Author Listed], Tools for everything you want to do. Matterport, Inc. 2021. https://matterport.com/3d-capture-applications [last accessed Jan. 20, 2021]. 9 pages.

[No Author Listed], What can I do if my package was damaged? United Parcel Service of America, Inc. 2021. https://www.ups.com/us/en/help-center/sri/damaged-package.page [last accessed Jan. 18, 2021]. 2 pages.

Baldwin. NRf2020: Wayfair's journey to 3D imagery. Essential Retail. Jan. 14, 2020:6 pages. https://web.archive.org/web/20200930053454/https://www.essentialretail.com/news/nrf2020-wayfair-3d-imagery/ [Last accessed Sep. 10, 2021].

Bestor, Boxify. Github. Jul. 12, 2017. https://github.com/alunbestor/Boxify [last accessed May 28, 2021]. 2 pages.

Bock, NRF 2020: Our Key Conclusions on the Value of Stores as Destinations. Valtech Insights. Jan. 26, 2020:7 pages, https://www.valtech.com/insights/nrf-2020-our-key-conclusions-on-the-value-of-stores-as-destinations/ [Last accessed Sep. 10, 2021].

Brennesholtz, 3D and AR Imaging at NRF. Display Daily. 2020. https://www.displaydaily.com/article/display-daily/3d-and-ar-imaging-at-nrf [Last accessed Sep. 10, 2021].

Brent, An Algorithm with Guaranteed Convergence for Finding a Zero of a Function. Algorithms for Minimization Without Derivatives. Prentice-Hall. 1973. Chapter 4:47-60.

Brent, The Use of Successive Interpolation for Finding Simple Zeros of a Function and its Derivatives. Algorithms for Minimization Without Derivatives. Prentice-Hall. 1973. Chapter 3:19-46.

Carter et al., NudgeCam: Toward targeted, higher quality media capture. Proceedings of the 18th ACM international conference on Multimedia. Oct. 25, 2010:615-618.

Chalfen, Snapshot versions of life. Bowling Green State University Popular Press. 1987. 222 pages.

Davidovich, Everything You Need to Know About Product Photography Pricing. Squareshot. Apr. 30, 2020. https://www.squareshot.co/post/everything-you-need-to-know-about-product-photography-pricing [last accessed May 28, 2021]. 22 pages.

Enthed, A retailers way into 3D: IKEA. ACM Siggraph 2013 Studio Talks. Jul. 21, 2013:1 page.

Fan et al., Adoption of augmented reality in online retailing and consumers' product attitude: A cognitive perspective. Journal of Retailing and Consumer Services. Mar. 1, 2020;53:101986. 10 pages.

Fernandez et al., Fast and robust multiple colorchecker detection using deep convolutional neural networks. Image and Vision Computing. Jan. 1, 2019;81:15-24.

Fernandez, colorchecker-detection. GitHub. Jun. 29, 2019. https://github.com/pedrodiamel/colorchecker-detection [last accessed May 28, 2021]. 6 pages.

Freedman, Building ecommerce content you can bank on. Demandware, Inc. 2008. 24 pages.

Herskovitz et al., Opportunities for in-home augmented reality guidance. Extended Abstracts of the 2019 CHI Conference on Human Factors in Computing Systems. May 2, 2019:1-6.

Jarusriboonchai et al., Let's take photos together: exploring asymmetrical interaction abilities on mobile camera phones. Proceedings of the 18th International Conference on Human-Computer Interaction with Mobile Devices and Services. Sep. 6, 2016:529-540.

Jetter et al., Augmented reality tools for industrial applications: What are potential key performance indicators and who benefits?. Computers in Human Behavior. Oct. 1, 2018;87:18-33.

Karlsson, AR: Shipping. Dribbble. 2021. https://dribbble.com/shots/8195589-AR-Shipping [last accessed Jun. 28, 2021]. 10 pages.

Keep, Artist with a camera-phone: A decade of mobile photography. In: Mobile media making in an age of smartphones. Springer. 2014. Berry et al., Eds. Chapter 2:14-24.

Khakimdjanova et al., Online visual merchandising practice of apparel e-merchants. Journal of Retailing and Consumer Services. Sep. 1, 2005;12(5):307-18.

Kim et al., LetsPic: supporting in-situ collaborative photography over a large physical space. Proceedings of the 2017 CHI Conference on Human Factors in Computing Systems. May 2, 2017:4561-4573.

Kragelund, How to Build Your Own Ecommerce Photography Studio. BigCommerce Pty. Ltd. 2021. https://www.bigcommerce.com/blog/how-to-build-your-own-efficient-ecommerce-photography-studio/#undefined [last accessed Jan. 12, 2021]. 38 pages.

Kuo et al., Luxapose: Indoor positioning with mobile phones and visible light. Proceedings of the 20th annual international conference on Mobile computing and networking. Sep. 7, 2014:447-458.

(56) References Cited

OTHER PUBLICATIONS

Lackermair et al., Importance of online product reviews from a consumer's perspective. Advances in economics and business. 2013;1(1):1-5.

Li et al., Guided selfies using models of portrait aesthetics. Proceedings of the 2017 Conference on Designing Interactive Systems. Jun. 10, 2017:179-190.

Liu et al., Evaluating the benefits of real-time feedback in mobile augmented reality with hand-held devices. Proceedings of the SIGCHI Conference on Human Factors in Computing Systems. May 5, 2012:2973-2976.

Lusk et al., Cake Cam: Take Your Photo and Be in it Too. Proceedings of the 21st International Conference on Human-Computer Interaction with Mobile Devices and Services. Oct. 1, 2019:1-9.

Maier et al., The positive effect of contextual image backgrounds on fluency and liking. Journal of Retailing and Consumer Services. Jan. 1, 2018;40:109-16.

Orendorff, The Plague of Ecommerce Return Rates and How to Maintain Profitability. Shopifyplus. Feb. 27, 2019. https://www.shopify.com/enterprise/ecommerce-returns [last accessed Jun. 28, 2021]. 21 pages.

Press et al., Van Wijngaarden-Dekker-Brent Method. In: Numerical Recipes in FORTRAN 77: The Art of Scientific Computing, 2nd ed. Cambridge University Press. 1992. Chapter 9.3;1:352-355.

Rawat et al., ClickSmart: A context-aware viewpoint recommendation system for mobile photography. IEEE Transactions on Circuits and Systems for Video Technology. Apr. 21, 2016;27(1):149-58.

Rawat et al., Context-aware photography learning for smart mobile devices. ACM Transactions on Multimedia Computing, Communications, and Applications (TOMM). Oct. 21, 2015;12(1s):1-24.

Reagan, That sweater you don't like is a trillion-dollar problem for retailers. These companies want to fix it. CNBC. Jan. 12, 2019. https://www.cnbc.com/2019/01/10/growing-online-sales-means-more-returns-and-trash-for-landfills.html [last accessed Jan. 12, 2021]. 7 pages.

Reyes et al., Mixed Reality Guidance System for Motherboard Assembly Using Tangible Augmented Reality. Proceedings of the 2020 4th International Conference on Virtual and Augmented Reality Simulations. Feb. 14, 2020:1-6.

Rodrigues et al., Exploring mixed reality in specialized surgical environments. Proceedings of the 2017 CHI Conference Extended Abstracts on Human Factors in Computing Systems. May 6, 2017:2591-2598.

Rojas-Munoz et al., The System for Telementoring with Augmented Reality (STAR): A head-mounted display to improve surgical coaching and confidence in remote areas. Surgery. Apr. 1, 2020;167(4):724-31.

Rosebrock, Blur detection with OpenCV. PyImageSearch. Sep. 7, 2015. https://www.pyimagesearch.com/2015/09/07/blur-detection-with-opencv/ [last accessed May 28, 2021]. 72 pages.

Salazaar-Gamarra et al., Monoscopic photogrammetry to obtain 3D models by a mobile device: a method for making facial prostheses. Journal of Otolaryngology—Head & Neck Surgery. Dec. 2016;45(1):1-3.

Thees et al., Effects of augmented reality on learning and cognitive load in university physics laboratory courses. Computers in Human Behavior. Jul. 1, 2020;108:106316. 11 pages.

Thomas, The Art and Style of Product Photography. John Wiley & Sons, Inc. 2014:290 pages.

Verma et al., Indoor Navigation Using Augmented Reality. Proceedings of the 2020 4th International Conference on Virtual and Augmented Reality Simulations (ICVARS 2020). 2020:58-63.

Xu et al., Real-time guidance camera interface to enhance photo aesthetic quality. Proceedings of the 33rd annual ACM conference on human factors in computing systems. Apr. 18, 2015:1183-1186.

[No Author Listed], See Your Space IRL. Macy's. 2022. 7 pages. https://www.macys.com/ce/virtual-room-designer/index?keyword=AR+furniture [Last accessed Apr. 1, 2022].

Bonetti et al., Augmented reality and virtual reality in physical and online retailing: A review, synthesis and research agenda. Augmented reality and virtual reality. 2018:119-32.

Ozturkcan, Service innovation: Using augmented reality in the IKEA Place app. Journal of Information Technology Teaching Cases. May 2021; 1(1):8-13.

* cited by examiner

SYSTEMS AND METHODS FOR SCANNING THREE-DIMENSIONAL OBJECTS

This application claims the benefit under 35 U.S.C. § 119(e) of the filing date of U.S. provisional patent application Ser. No. 62/756,047, entitled "SYSTEMS AND METHODS FOR SCANNING THREE-DIMENSIONAL OBJECTS", Nov. 5, 2018, which is herein incorporated by reference in its entirety.

BACKGROUND

Some companies primarily sell products (e.g., furniture, toys, clothing, and electronics) through an online computer interface instead of through conventional brick-and-mortar stores. As a result, consumers typically demand high-quality images of the products in multiple scenes because they are generally unable to see the product in-person prior to purchase. Accordingly, these companies typically ship each product to a studio where the product is scanned using a sophisticated 3-dimensional (3D) scanner to generate a high-quality 3D digital model of the product. The high-quality 3D digital model of the product may be combined with high-quality 3D digital models of various background scenes to generate photorealistic images using 3D rendering techniques. These photorealistic images of the product in various scenes may be shown through the online computer interface to provide consumers an accurate representation of the product without seeing the product in-person.

SUMMARY

According to at least one aspect, at least one non-transitory computer-readable storage medium storing processor-executable instructions is provided. The processor-executable instructions, when executed by at least one hardware processor, cause the at least one hardware processor to perform: generating a first 3-dimensional (3D) model of an object; identifying a set of imaging positions from which to capture at least one image based on the first 3D model of the object; obtaining a set of images of the object captured at, or approximately at, the set of imaging positions; and generating a second 3D model of the object based on the set of images.

According to at least one aspect, a system for scanning an object is provided. The system comprises at least one hardware processor; and at least one non-transitory computer-readable storage medium storing processor executable instructions that, when executed by the at least one hardware processor, cause the at least one hardware processor to perform: generating a first 3-dimensional (3D) model of the object; identifying a set of imaging positions from which to capture at least one image based on the first 3D model of the object; obtaining a set of images of the object captured at, or approximately at, the set of imaging positions; and generating a second 3D model of the object based on the set of images.

According to at least one aspect, a method of scanning an object is provided. The method comprises generating a first 3-dimensional (3D) model of the object; identifying a set of imaging positions from which to capture at least one image based on the first 3D model of the object; obtaining a set of images of the object captured at, or approximately at, the set of imaging positions; and generating a second 3D model of the object based on the set of images.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

DETAILED DESCRIPTION

Figure 1:
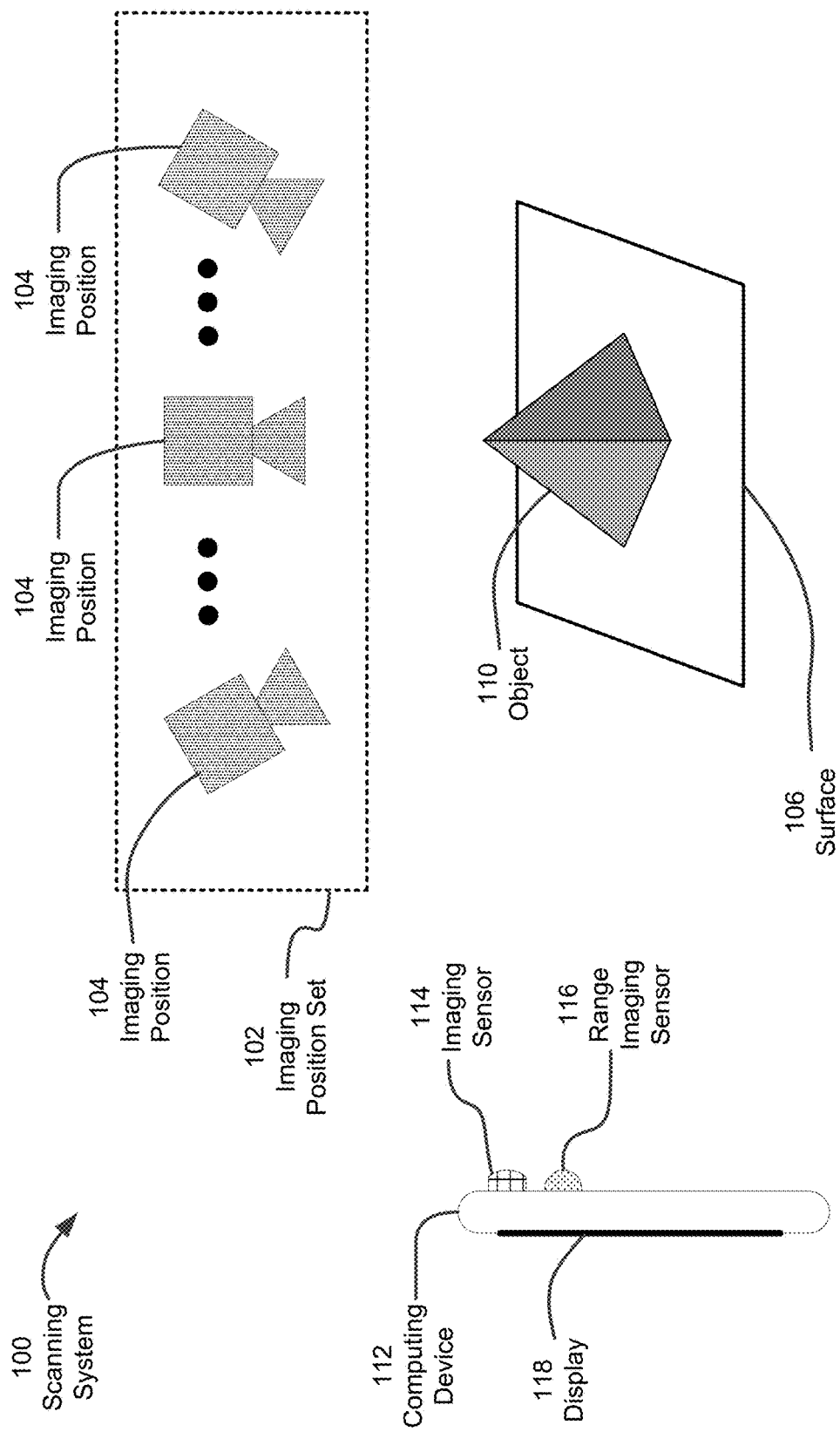
FIG. 1 is a diagram of an example scanning system, according to some embodiments of the technology described herein.

As mentioned above, consumers typically demand high-quality images of products in various scenes prior to purchase if they do not have the opportunity to see the products in-person. These high-quality images of the products may be generated based on 3D digital models (referred to as "3D models" herein for simplicity) of the products. For example, 3D rendering techniques may be employed to generate an image of a product using the 3D model of the product. Such 3D rendering techniques typically require a high-quality 3D model in order to create images that are photorealistic. As a result, these high-quality 3D models typically must be generated using sophisticated 3D scanners.

The inventors have appreciated that the sophisticated 3D scanners that generate high quality 3D models suitable for creating photorealistic images are prohibitively expensive and complex. For example, such a sophisticated 3D scanner capable of scanning large objects (e.g., a piece of furniture) may cost in excess of $20,000 per unit. While less expensive 3D scanners are available, such 3D scanners do not generate 3D models with sufficient accuracy to be suitable for creating photorealistic images. For example, a 3D model created by an inexpensive scanner may have holes, artifacts, and/or incorrect proportions.

Accordingly, the inventors have developed new techniques to create high-quality 3D models using a significantly simpler and less expensive scanning system. In some embodiments, the scanning techniques described herein may be implemented using a portable computing device, such as a mobile smart phone or a tablet. In these embodiments, the scanning techniques may leverage the existing sensors commonly integrated into the portable computing device and/or sensors that may be easily communicatively coupled to the portable computing device to generate the 3D model. For example, the 3D model may be generated using images captured using a camera integrated into the portable computing device and/or range images indicative of distances to points in a scene captured from a range imaging sensor attached to the portable computing device, such as the structure sensor by OCCIPITAL. As a result, the scanning techniques described herein may be implemented using an inexpensive portable computing device and a range imaging sensor that may be readily acquired for less than $1,000.

The scanning system may employ a combination of 3D scanning techniques to generate high-quality 3D models using inexpensive hardware. In these embodiments, the scanning system may create a crude model of the object using a first 3D scanning technique and refine the crude 3D model of the object using a second, different 3D scanning technique to create a refined 3D model that more closely matches the true shape of the object. For example, the scanning system may create a crude 3D model of the object by obtaining a set of range images of the object from various perspectives and generating the crude 3D model using the captured set of range images. While the crude model may be unsuitable as-is for creating a photorealistic image, the crude 3D model may be of sufficient quality to identify one or more characteristics of the object (e.g., location of faces of the object, general dimensions of the object, etc.). The identified one or more characteristics of the object may, in turn, be employed to customize the scan of the object using the second, different 3D scanning technique such as photogrammetry (e.g., sterophotogrammetry). For example, the set of characteristics of the object identified using the crude model may be employed to identify imaging positions from which images of the object should be captured. A user may be guided (e.g., via instructions from a user interface) to capture images from each of the imaging positions. The set of captured images from the imaging positions may be employed, alone or in combination with the crude model, to generate the refined model using photogrammetry. The refined model may be of higher quality than the crude model and, unlike the crude model, may be suitable for generating photorealistic images of the object.

Employing a combination of 3D modeling techniques provides numerous benefits relative to employing a single set of techniques (e.g., photogrammetry) alone. Conventional scanning systems that employ photogrammetry alone to create high-quality 3D models typically do not have any information regarding the shape of the object prior to capturing the images of the object. Thus, conventional scanning systems typically capture numerous images of the object being scanned (e.g., at least 100 images) such that the scanning system can accurately generate 3D models for objects of virtually any shape. As a result, such traditional scanning systems may include arrays of expensive cameras to capture images from various angles and a turntable to rotate the object between capturing images. In contrast, the techniques described herein employ a crude model of the object to identify various characteristics of the object prior to capturing the images of the object. Accordingly, the number of images and the imaging positions from which the images are captured may be specifically tailored based on the identified characteristics of the object. The reduction in the number of images that need to be captured makes it feasible for the user to capture the images (e.g., by following instructions provided via a user interface) on a single camera (e.g., a camera integrated into a smart phone). As a result, the arrays of expensive cameras and the turntables common in conventional scanning systems that perform photogrammetry are no longer required.

The characteristics of the object obtained from the crude model may be employed to generate the imaging positions in any of a variety of ways. In some embodiments, the crude model may be employed to identify the faces of the object. The faces of the object may include, for example, continuous regions on the surface of the object that may be bounded by one or more edges. Faces of an object may be flat, substantially flat, or curved. In these embodiments, an imaging position may be generated for at least some of the identified faces of the object that includes a viewing direction that is perpendicular to the face and has a field of view substantially large so as to include most (if not all) of the area of the face. Further, an imaging position may be generated for each edge where two or more faces meet with a field of view that includes at least some of each of the faces adjacent the respective edge. As a result, a set of images captured at the imaging locations may include information regarding each face of the object and the edges along which various faces meet.

As discussed above, the scanning techniques described herein may provide a user interface to guide a user to capture images at the identified set of imaging positions in some embodiments. The user interface may be, for example, an extended reality (XR) interface. Example XR interfaces include augmented reality (AR) interfaces, virtual reality (VR) interfaces, and mixed reality (MR) interfaces. In these embodiments, the user interface may overlay an imaging position marker onto a real-world scene (e.g., captured using a camera) at a location in the scene from which an image should be captured. Thus, a user may simply move the camera to the imaging location and aim the camera at the object to trigger an image to be captured. Once an image associated with an imaging position marker has been captured, the imaging position marker may be removed from the user interface to indicate to the user that the image from the imaging position has been determined.

In some embodiments, the imaging positions may not be precise locations in 3D space. Instead, the imaging positions may be regions in 3D space with a non-zero volume. For example, the imaging positions may be bounded volumes in 3D space from which an image should be captured. These bounded volumes may be, for example, spherical, square, and/or rectangular volumes. By employing bounded volumes as imaging positions, instead of precise locations, the scanning techniques may take into account the human error introduced by instructing a user to position the camera (e.g., caused by shaking hands).

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

FIG. 1 shows an example scanning system 100 that is configured to generate a 3D model of an object 110 that may be disposed on a surface 106. The generated 3D model of the object 110 may be sufficient quality to create a photorealistic image of the object 110. The object 110 may be, for example, a piece of furniture such as: a couch, a chair, a desk, a table, a shelf, a bookcase, a bed, a nightstand, a cabinet, a rug, a dresser, a wardrobe, an entertainment center, and/or a decorative item (e.g., a statute, a piece of wall art, a picture frame, a book, and a vase). As shown in FIG. 1, the scanning system 100 comprises a computing device 112, an imaging sensor 114, a range imaging sensor 116, and a display 118. In some embodiments, the scanning system 100 may generate a crude 3D model of the object using a first technique and generate a refined 3D model of the object based on the crude 3D model using a second technique. For example, the scanning system 100 may generate a crude model of the object 110 based on a set of range images captured using the range imaging sensor 116. The scanning system 100 may, in turn, employ the crude model to identify a plurality of imaging positions 104 (shown as imaging position set 102) from which to capture images of the object 110 using the imaging sensor 114. The captured set of images may be employed, alone or in conjunction with the crude model, to generate the refined second 3D model.

The range imaging sensor 116 may be configured to measure a distance between the range imaging sensor 116 and points in a scene. The output of the range imaging sensor 116 may be employed to generate (e.g., by the computing device 112) a range image. The range image may comprise a plurality of pixel values that correspond to distances between the range imaging sensor 116 and points in the scene. The range imaging sensor 116 may be implemented in any of a variety ways using any of a variety to techniques. For example, the range imaging sensor 116 may project a pattern (e.g., a speckle pattern) of infrared light onto the scene and capture infrared images of the scene. The captured infrared images may, in turn, be analyzed to extract the distorted pattern of infrared light visible in the scene. The difference between the pattern of infrared light as projected and the distorted pattern of infrared light may be employed to identify distances between the range imaging sensor 116 and points in the scene. An example device that may be employed as the range imaging sensor 116 is the structure sensor by OCCIPITAL.

The imaging sensor 114 may be configured to sense at least some visible light (e.g., light with a wavelength between 390 nanometers and 700 nanometers). The output of the imaging sensor 114 may be employed to generate (e.g., by the computing device 112) an image. The imaging sensor 114 may be implemented as a camera that includes a sensor array (e.g., a charge coupled device (CCD) sensor array or a complementary metal-oxide-semiconductor (CMOS) sensor array) and one or more optical elements (e.g., lenses, mirrors, etc.).

The display 118 may be configured to output information. For example, the display 118 may be configured to display a user interface, such as an XR interface, to a user. The display 118 may be implemented in any of a variety of ways. For example, the display 118 may comprise a liquid crystal display (LCD) screen, a light-emitting diode (LED) display, and/or a plasma screen. Additionally, the display 118 may include one or more mechanisms to receive input from a user. For example, the display 118 may be implemented as a touch screen that is configured to recognize gestures made on the display 118 (e.g., by a finger of the user, a stylus, etc.).

The computing device 112 may be configured to generate one or more models of the object 110 based on received sensor information, such as information obtained from the imaging sensor 114 and/or the range imaging sensor 116. The sensors (e.g., the imaging sensor 114 and/or the range imaging sensor 116) may be communicatively coupled to the computing device 112 and/or integrated into the computing device 112. For example, the computing device 112 may be implemented as a smartphone or a tablet where at least the display 118 and the imaging sensor 114 are integrated into the computing device 112. In this example, the range imaging sensor 116 may be external to the computing device 112 or integrated with the computing device 112. The computing device 112 may be implemented as, for example, a portable computing device such as a mobile smartphone or a tablet.

The computing device 112 may be configured generate the 3D model of the object 110 in any of a variety of ways. In some embodiments, the computing device 112 may be configured to build a crude model of the object 110 using the output from the range imaging sensor 116. For example, the computing device 112 may instruct a user (e.g., via the display 118) to move the range imaging sensor 116 (and/or the computing device 112) around the object 110 while aiming the range imaging sensor 116 at the object 110. The computing device 112 may employ the output of the range imaging sensor 116 to build a crude model of the object 110. Once the crude model of the object 110 has been generated, the computing device 112 may identify the imaging positions 104 from which images of the object 110 should be captured for generation of a refined model of the object 110. The computing device 112 may identify the imaging positions 104 by identifying the faces of the object 110 using the crude model and adding an imaging position 104 for each face with a viewing direction that is normal to the face and a field of view that encompasses a minimum threshold area of the face (e.g., at least 75% of the area of the face, at least 90% of the area of the face, or 100% of the area of the face). Additionally, the computing device 112 may add an imaging position 104 for each edge where two or more faces meet with a field of view that includes at least some portion of each of the two or more faces. Once the imaging positions have been identified, the imaging positions may be output to a user via a user interface in the display 118. The computing device may guide, via the user interface in the display 118, the user to capture images at each of the imaging positions 104. Once the images of the object 110 have been captured, the images may be employed (alone or in combination with the crude model) to generate the refined model (e.g., using photogrammetry).

Figure 2:
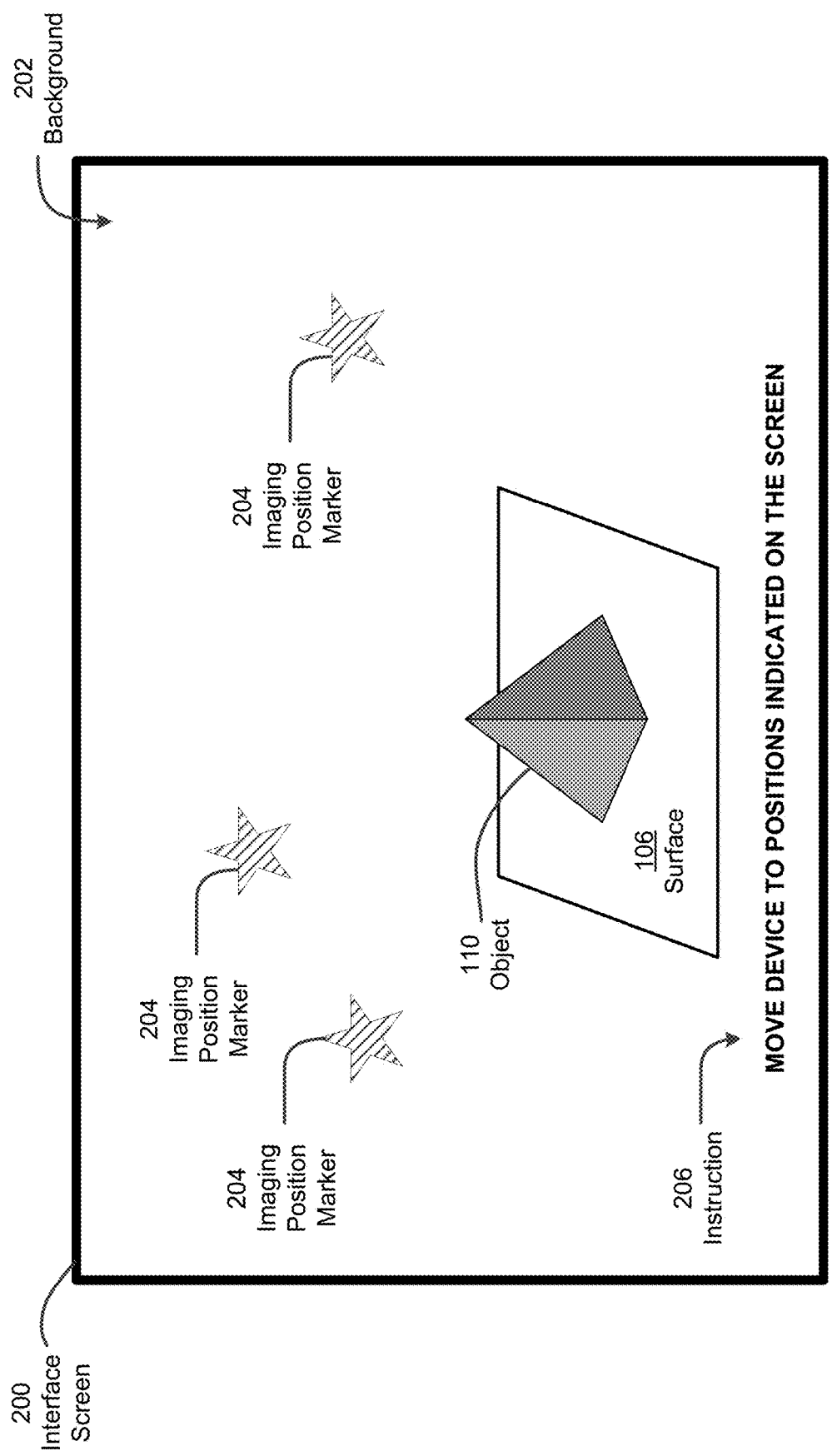
FIG. 2 is a diagram of an example user interface, according to some embodiments of the technology described herein.

FIG. 2 shows an example interface screen 200 that may presented to guide the user to capture the appropriate images to generate the 3D model of the object. The interface screen 200 may be an XR interface screen presented to a user on, for example, a display (e.g., display 118). The interface screen 200 comprise a background 202 that may be, for example, an image of a scene captured via an imaging sensor (e.g., imaging sensor 114) that faces away from the display. As shown, the background 202 may contain elements from the real-world environment such as the object 110 and the surface 106. The interface screen 200 may include one or more elements superimposed on the background 202 such as imaging position markers 204 and an instruction 206. The imaging position markers 204 may denote locations from which the imaging sensor (e.g., imaging sensor 114) should be positioned to capture images of the object 110. Once an image has been taken from the imaging position associated with one of the imaging position markers 204, the imaging position marker 204 may be removed from the interface screen 200 to show that an image no longer needs to be taken from that position. The instruction 206 may, for example, instruct the user the next task to perform, such as moving the device to the positions indicated on the screen.

Figure 3:
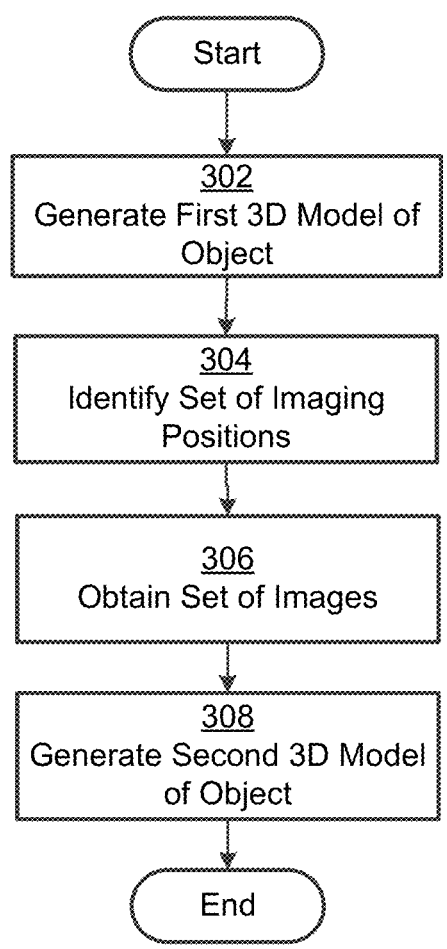
FIG. 3 is a flowchart of an example process for scanning an object, according to some embodiments of the technology described herein.

FIG. 3 shows an example process 300 for generating a 3D model of an object. Process 300 may be performed by, for example, a computing device (e.g., computing device 112). As shown, process 300 comprises an act 302 of generating a first 3D model of the object, an act 304 of identifying a set of imaging positions, an act 306 of obtaining a set of images, and an act 308 of generating a second 3D model of the object.

In act 302, the computing device may generate a first 3D model of the object. The computing device may generate the first 3D model of the object using any of a variety of techniques. In some embodiments, the first 3D model may be generated using range imaging techniques. In these embodiments, the computing device may obtain one or more range images of the object captured using a range imaging sensor (e.g., range imaging sensor 116). For example, the computing device may obtain a set of range images of the object from different perspectives. The obtained range images may, in turn, be employed to generate the first 3D model. It should be appreciated that the first 3D model of the object may be generated using other techniques separate and apart from range imaging. For example, the first 3D model may be generated using LIDAR techniques (sometimes referred to as 3D laser scanning techniques).

In act 304, the computing device may identify a set of imaging positions from which to capture images of the object. The set of imaging positions may be selected such that a set of images captured from the set of imaging positions may be employed, alone or in combination with the first 3D model, to generate a high-quality 3D model (e.g., using photogrammetry). In some embodiments, the set of imaging positions may be generated from, for example, the first 3D model. In these embodiments, the computing device may identify the faces of the object using the first 3D model. The identified faces may, in turn, be employed to identify the imaging positions. For example, an imaging position may be generated for each face that has a viewing direction that is normal to the respective surface (and/or a field of view sufficiently large to capture a minimum area of the face). Additionally, an imaging position may be generated for each intersection of two faces with a field of view that includes the edge where two or more faces meet and overlaps at least partially with the field of view of the images associated with each of the two or more faces adjacent the edge. The percentage overlap between the field of view of the images may be, for example, between 5% and 90% overlap.

In act 306, the computing device may obtain a set of images that correspond to the identified set of imaging positions. The computing device may obtain at least one image captured from each of the set of imaging positions identified in act 304. The computing device may obtain the set of images by, for example, guiding a user to position an imaging sensor in the set of imaging positions through a user interface, such as an XR interface. For example, the computing device may be a portable computing device with an integrated imaging sensor, such as a mobile smartphone or a tablet, that presents an augmented reality interface to the user. The augmented reality interface may overlay imaging position markers onto a real-world environment that show a user where to position the portable computing device such that an image of the object may be captured. Once a user positions the portable computing device in a position indicated by one of the position markers and aims the imaging sensor at the object, the portable computing device may automatically trigger an image to the captured and stop presenting the imaging position marker (e.g., to indicate that an image from the particular imaging position is no longer needed). Thus, a user may be guided to position the portable computing device in the proper positions such that the set of images may be obtained.

In act 308, the computing device may generate a second 3D model of the object using the set of images. The computing device may generate the second 3D model based on the set of images alone or in conjunction with the first 3D model. For example, the second 3D model may be generated based on the set of images alone using photogrammetry techniques. In another example, the computing device may refine one or more sections of the first 3D model (e.g., faces with aberrations, holes, etc.) using the second set of images instead of simply generating the second 3D model from the set of images directly.

It should be appreciated that one or more acts in process 300 may be repeated to increase the quality of the resulting model. For example, the computing device may determine that the second 3D model generated in act 308 is of insufficient quality to be employed for creating a photorealistic image of the object (e.g., the second 3D model has holes, artifacts, etc.). In this example, the computing device may return to act 304 and generate a new set of imaging positions that includes new imaging positions relative to the previous iteration. Thus, in act 306 additional images may be obtained that may, in turn, be employed in act 308 generate another 3D model of the object. If the computing device determines that the new 3D model is of sufficient quality to be employed for creating a photorealistic image of the object, process 300 may end. Otherwise, the computing device may again repeat the acts 304, 306, and 308 until the 3D model of the object is of sufficient quality.

The processes described above are illustrative embodiments and are not intended to limit the scope of the present disclosure. The acts in the processes described above may be ordered in any suitable way. Accordingly, embodiments may be constructed in which acts are performed in an order different than illustrated, which may include performing some acts simultaneously, even though shown as sequential acts in illustrative embodiments.

Figure 4:
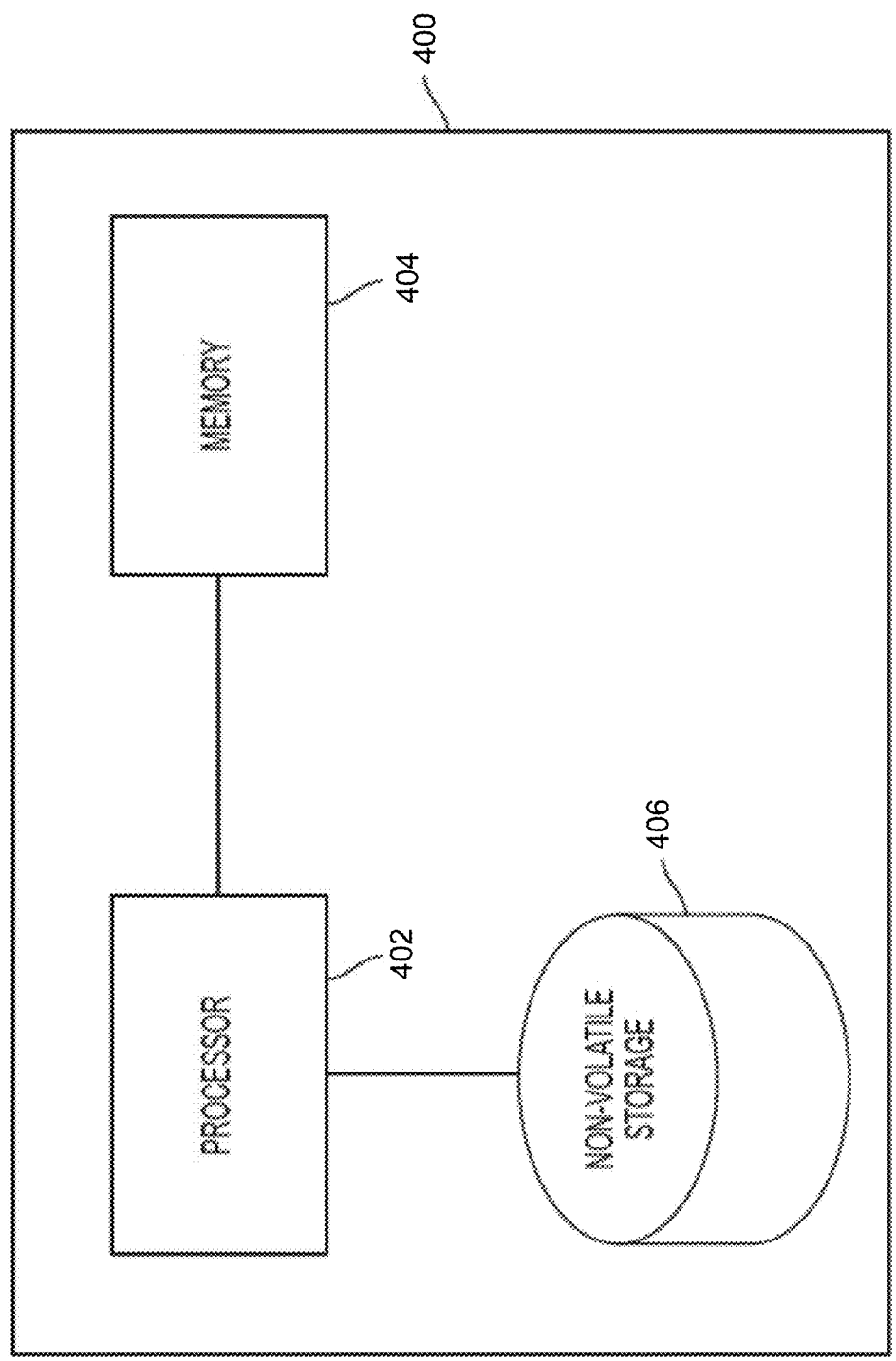
FIG. 4 is a block diagram of an example computer system, according to some embodiments of the technology described herein.

An illustrative implementation of a computing device 400 that may be used in connection with any of the embodiments of the disclosure provided herein is shown in FIG. 4. The computing device 400 may include one or more computer hardware processors 402 and one or more articles of manufacture that comprise non-transitory computer-readable storage media (e.g., memory 404 and one or more non-volatile storage devices 406). The processor 402(*s*) may control writing data to and reading data from the memory 404 and the non-volatile storage device(s) 406 in any suitable manner. To perform any of the functionality described herein, the processor(s) 402 may execute one or more processor-executable instructions stored in one or more non-transitory computer-readable storage media (e.g., the memory 404), which may serve as non-transitory computer-readable storage media storing processor-executable instructions for execution by the processor(s) 402.

The terms "program" or "software" are used herein in a generic sense to refer to any type of computer code or set of processor-executable instructions that can be employed to program a computer or other processor (physical or virtual) to implement various aspects of embodiments as discussed above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. At least one non-transitory computer-readable storage medium storing processor-executable instructions that, when executed by at least one hardware processor, cause the at least one hardware processor to perform: generating a first 3-dimensional (3D) model of an object,
   wherein the first 3D model of the object comprises information indicative of locations of edges along which faces of the object meet;
   identifying one or more characteristics of the object using the first 3D model of the object, wherein identifying the one or more characteristics of the object comprises identifying at least one face of the object using the first 3D model;
   identifying a set of imaging positions from which to capture at least one image of the object based on the one or more characteristics of the object identified using the first 3D model of the object, wherein identifying the set of imaging positions comprises:
   identifying a first imaging position where at least a first face of the object and a second face of the object meet;
   obtaining a set of images of the object captured at, or approximately at, the set of imaging positions; and
   generating a second 3D model of the object based on the set of images.

2. The at least one non-transitory computer-readable storage medium of claim 1, wherein identifying the set of imaging positions further comprises:
   identifying a second imaging position as a position having a viewing direction that is normal to the first face of the object; and
   identifying a third imaging position as a position having a viewing direction that is normal to the second face of the object.

3. The at least one non-transitory computer-readable storage medium of claim 2, wherein identifying the [[at least one imaging position]] set of imaging positions further comprises:
   identifying a fourth imaging position as a position having a field of view that includes at least a portion of the first face of the object and at least a portion of the second face of the object.

4. The at least one non-transitory computer-readable storage medium of claim 1, wherein generating the second 3D model of the object comprises:
   generating the second 3D model of the object based on the set of images using photogrammetry.

5. The at least one non-transitory computer-readable storage medium of claim 1, wherein generating the second 3D model of the object comprises:
   generating the second 3D model of the object based on the first 3D model and the set of images.

6. The at least one non-transitory computer-readable storage medium of claim 1, wherein the set of imaging positions is a first set of imaging positions, wherein the set of images of the object is a first set of images of the object and wherein the processor-executable instructions, when executed by the at least one hardware processor, further cause the at least one hardware processor to perform:

identifying a second set of imaging positions from which to capture at least one image based on the second 3D model of the object;

obtaining a second set of images of the object captured at, or approximately at, the second set of imaging positions; and generating a third 3D model of the object based on the second set of images.

7. The at least one non-transitory computer-readable storage medium of claim 1, wherein obtaining the set of images comprises:

outputting an indication of at least some imaging positions from the set of imaging positions, wherein outputting the indication of the at least some imaging positions comprises displaying the indication of the at least some imaging positions in an extended reality (XR) interface.

8. The at least one non-transitory computer-readable storage medium of claim 7, wherein the displaying the indication of the at least some imaging positions in the XR interface comprises:

displaying the indication of the at least some imaging positions in an augmented reality interface on a display.

9. The at least one non-transitory computer-readable storage medium of claim 1, wherein obtaining the set of images comprises:

obtaining the set of images using an imaging sensor.

10. The at least one non-transitory computer-readable storage medium of claim 1, wherein the processor-executable instructions, when executed by the at least one hardware processor, further cause the at least one hardware processor to perform:

obtaining at least one range image of the object; and generating the first 3D model based on the at least one range image of the object.

11. The at least one non-transitory computer-readable storage medium of claim 10, wherein obtaining the at least one range image of the object comprises:

obtaining the at least one range image of the object using a range imaging sensor.

12. The at least one non-transitory computer-readable storage medium of claim 1, wherein the first 3D model of the object further comprises information indicative of locations of the faces of the object.

13. A system for scanning an object, comprising: at least one hardware processor; and at least one non-transitory computer-readable storage medium storing processor executable instructions that, when executed by the at least one hardware processor, cause the at least one hardware processor to perform:

generating a first 3-dimensional (3D) model of the object, wherein the first 3D model of the object comprises information indicative of locations of edges along which faces of the object meet;

identifying one or more characteristics of the object using the first 3D model of the object, wherein identifying the one or more characteristics of the object comprises identifying at least one face of the object using the first 3D model;

identifying a set of imaging positions from which to capture at least one image of the object based on the one or more characteristics of the object identified using the first 3D model of the object, wherein identifying the set of imaging positions comprises:

identifying a first imaging position where at least a first face of the object and a second face of the object meet;

obtaining a set of images of the object captured at, or approximately at, the set of imaging positions; and generating a second 3D model of the object based on the set of images.

14. The system of claim 13, wherein identifying the set of imaging positions further comprises:

identifying a second imaging position as a position having a viewing direction that is normal to the first face of the object; and identifying a third imaging position as a position having a viewing direction that is normal to the second face of the object.

15. A method of scanning an object, the method comprising:

generating a first 3-dimensional (3D) model of the object, wherein the first 3D model of the object comprises information indicative of locations of edges along which faces of the object meet;

identifying one or more characteristics of the object using the first 3D model of the object, wherein identifying the one or more characteristics of the object comprises identifying at least one face of the object using the first 3D model;

identifying a set of imaging positions from which to capture at least one image of the object based on the one or more characteristics of the object identified using the first 3D model of the object, wherein identifying the set of imaging positions comprises:

identifying a first imaging position where at least a first face of the object and a second face of the object meet;

obtaining a set of images of the object captured at, or approximately at, the set of imaging positions; and generating a second 3D model of the object based on the set of images.

\* \* \* \* \*

UNITED STATES PATENT AND TRADEMARK OFFICE
CERTIFICATE OF CORRECTION

| | |
|---|---|
| PATENT NO. | : 11,557,060 B2 |
| APPLICATION NO. | : 16/597794 |
| DATED | : January 17, 2023 |
| INVENTOR(S) | : Michael Silvio Festa |

It is certified that error appears in the above-identified patent and that said Letters Patent is hereby corrected as shown below:

In the Claims

Column 10, Claim 3, Lines 47-48:
"storage medium of claim 2, wherein identifying the [[at least one imaging position]] set of imaging positions further"

Should read:
-- storage medium of claim 2, wherein identifying the set of imaging positions further --

Signed and Sealed this
Twenty-eighth Day of March, 2023

Katherine Kelly Vidal
*Director of the United States Patent and Trademark Office*